March 14, 1933.  A. C. MATHESON  1,900,991
PISTON
Filed April 23, 1931  2 Sheets-Sheet 1
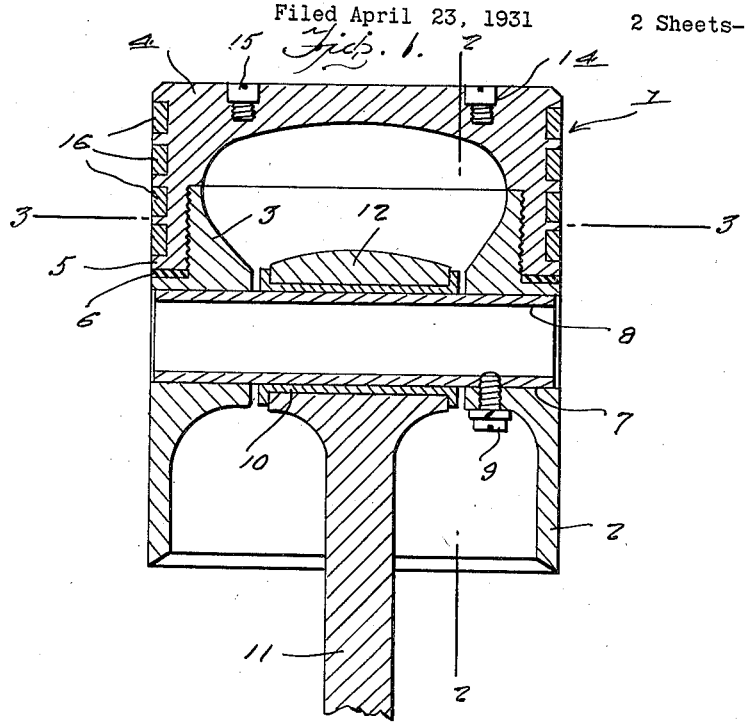
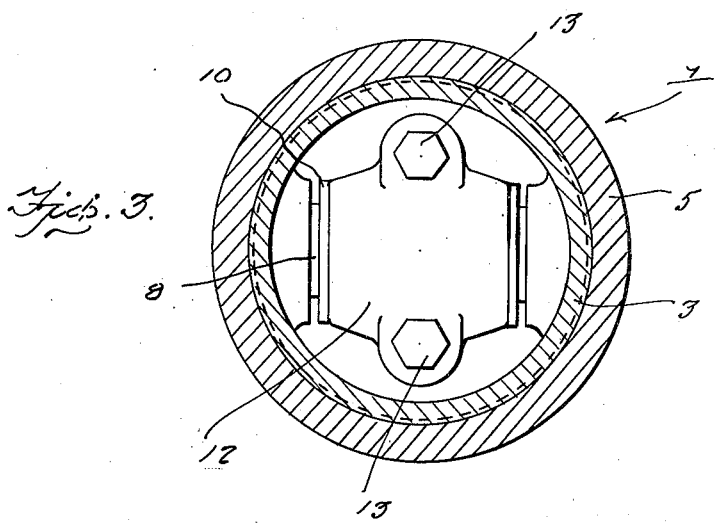
Inventor
A. C. Matheson
By Clarence A. O'Brien
Attorney March 14, 1933.  A. C. MATHESON  1,900,991
PISTON
Filed April 23, 1931  2 Sheets-Sheet 2
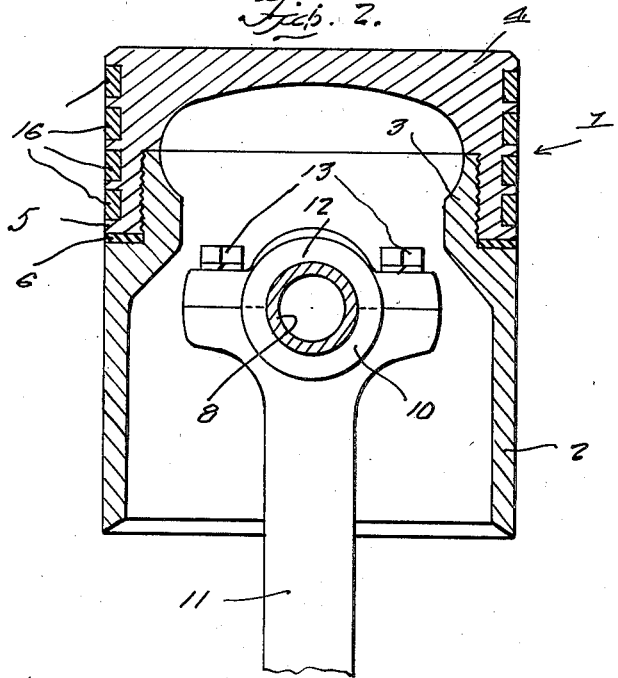
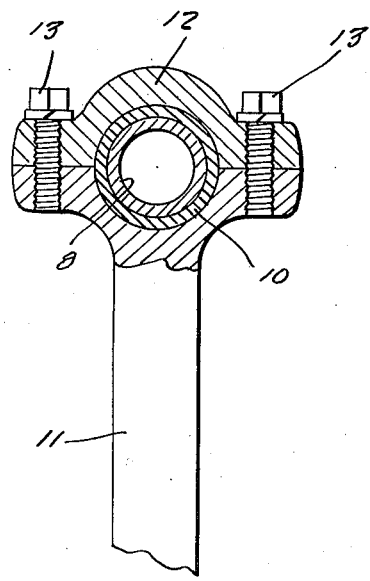
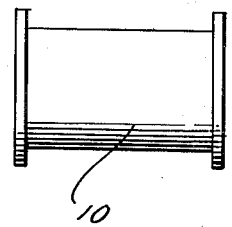
Inventor
A. C. Matheson
By Clarence A. O'Brien
Attorney Patented Mar. 14, 1933

1,900,991

UNITED STATES PATENT OFFICE

AXEL C. MATHESON, OF MINNEAPOLIS, MINNESOTA

PISTON

Application filed April 23, 1931. Serial No. 532,323.

This invention relates generally to pistons, and more particularly to new and useful improvements in pistons, for use in internal combustion engines, but it is understood, of course, that a piston in accordance with this invention may be used for any purpose and in any manner for which same may be found adapted and desirable.

An important object of the invention is to provide, in a manner as hereinafter set forth, a piston of the aforementioned character embodying a novel construction and arrangement of parts, whereby access may be had to the wrist pin bearing from the top of the engine after the head of said engine has been removed for the purpose of adjusting the wrist pin bearing or for removing the piston from the cylinder.

Another important object of the invention is to provide a piston of the character described having a removable head portion in which are seated the piston rings thus permitting removal of the rings with the head portion without the necessity of disturbing the wrist pin bearing.

Other objects of the invention are to provide a piston of the character set forth which will be simple in construction, strong, durable, efficient and reliable in operation and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical section through a piston constructed in accordance with this invention.

Figure 2 is a view in vertical section taken at right angles to Figure 1, and taken substantially on the line 2—2 of Figure 1.

Figure 3 is a view in horizontal section taken substantially on the line 3—3 of Figure 1.

Figure 4 is a view in vertical section showing the connecting rod bearing.

Figure 5 is a view in elevation showing the bushing which constitutes one of the elements of the connecting rod bearing.

Referring now to the drawings in detail, it will be seen that the piston is designated generally by the reference numeral 1 and comprises a skirt portion 2 having an integral, reduced, externally threaded neck 3 on its upper end with which is threadedly connected the head portion 4 having an internally threaded depending portion 5 which is threaded on the neck 3. A suitable gasket 6 is provided between the skirt 2 and the head 4 for assuring a leakproof joint therebetween.

The skirt 2 is provided with lined openings 7 in diametrically opposite sides thereof for the reception of the end portions of a wrist pin 8 which is secured in position through the medium of a set screw 9 which is threaded into one end portion thereof. A bushing 10 encircles the wrist pin 8 and is provided with the usual end flanges. The reference numeral 11 designates a connecting rod having a removable bearing cap 12 secured on its upper end around the bushing 10 through the medium of the bolts 13, the heads of which are engaged on the bearing cap 12.

The head 4 is provided, in its top, with sockets 14, the lower end portions of which are reduced and threaded to receive the threaded shanks of the removable screw plugs 15.

When access to the bolts 13 of the wrist pin bearing is desired, the screw plugs 15 are removed from the head 4 and in this manner spaced sockets are provided for the reception of a suitable tool such as a spanner wrench (not shown). It is understood, of course, that the head of the engine is removed. Through the medium of the spanner wrench or other tool the head 4 may be unthreaded from the skirt portion 3 and removed from the engine cylinder. Then, a suitable wrench may be applied to the heads of the bolts 13 for removing said bolts and the bearing cap 12.

It will be noted that the rings which are designated by the reference numeral 16 will be removed from the cylinder with the head 4, thus permitting said rings to be inspected and replaced without disturbing the coupling between the piston and the connecting rod 11.

It is believed that the many advantages of a piston constructed in accordance with this invention will be readily understood, and although the preferred embodiment of the invention is as illustrated and described, it is to be understood that changes in the details of construction, and its combination and arrangement of parts, may be resorted to which will fall within the scope of the invention as claimed.

Having thus described my invention, what I claim as new is:

A piston of the class described comprising a lower part, a stationary wrist pin carried thereby, a bushing rotatably arranged on the pin and having flanges at its ends, a piston rod having a semi-circular recess at its upper end in which a part of the bushing fits, a cap having a semi-circular recess therein in which another part of the bushing fits, screw bolts for connecting the cap to the upper end of the rod, said bolts passing downwardly through threaded holes in the cap and upper end of the rod with their heads uppermost, a ring carrying head part threaded to the upper end of the lower part and having threaded sockets in its upper face for receiving a tool for threading the head to the lower part and removing the head from the lower part, screws fitting in the sockets for entirely closing the same, and having their heads flush with the upper face of the head part, said head part having a slightly reduced lower part of the same thickness throughout, grooves at its outer circumference for receiving some of the rings and its inner circumference threaded and the upper portion of the lower part of the piston being of less exterior diameter than the rest of said lower part and exteriorly threaded to engage the internal threads of the head part, the internal walls of said upper part of the lower part of the piston curving upwardly and outwardly to form a large space for facilitating manipulation of the cap of the connecting rod and the bolts which connect the cap with the rod.

In testimony whereof I affix my signature.

AXEL C. MATHESON.